United States Patent
Stute

(10) Patent No.: US 9,313,024 B1
(45) Date of Patent: Apr. 12, 2016

(54) KEYED COMMUNICATION TOKEN

(71) Applicant: Masergy Communications, Inc., Plano, TX (US)

(72) Inventor: Michael Roy Stute, Crystal River, FL (US)

(73) Assignee: Masergy Communications, Inc., Plano, TX (US)

( * ) Notice: Subject to any disclaimer, the term of this patent is extended or adjusted under 35 U.S.C. 154(b) by 0 days.

(21) Appl. No.: 13/917,049

(22) Filed: Jun. 13, 2013

(51) Int. Cl.
*H04L 29/06* (2006.01)
*H04L 9/08* (2006.01)

(52) U.S. Cl.
CPC ........................................ *H04L 9/08* (2013.01)

(58) Field of Classification Search
CPC ...... H04L 63/0428; H04L 9/08; G06F 21/606
See application file for complete search history.

(56) References Cited

U.S. PATENT DOCUMENTS

| | | | |
|---|---|---|---|
| 7,757,274 B2 | 7/2010 | Lillie et al. | |
| 8,132,242 B1 | 3/2012 | Wu | |
| 8,346,853 B2 | 1/2013 | Morris | |
| 2006/0294206 A1* | 12/2006 | Graveline et al. | 709/219 |
| 2013/0042111 A1 | 2/2013 | Fiske | |

OTHER PUBLICATIONS

E. Hammer-Lahav, HTTP Authentication: MAC Access Authentication, Feb. 8, 2012, draft-ietf-outh-v2-http-mac-01, pp. 1-40.*
International Search Report and Written Opinion date mailed Oct. 22, 2014; PCT International Application No. PCT/US2014/041944.

* cited by examiner

*Primary Examiner* — Izunna Okeke
(74) *Attorney, Agent, or Firm* — McGuireWoods LLP

(57) ABSTRACT

Systems and methods for keyed communication tokens. A method may include receiving a key and a seed at a computing device, calculating a pseudo-random value based, at least in part, upon the seed, creating a concatenated string using the key and the pseudo-random value, hashing the concatenated string into a token, and adding the token to a user agent issued by a web browser as part of a command transmitted by the computing device. A computer system may be configured to identify a key and a seed, generate a pseudo-random value using the seed, create a concatenated string using the key and the pseudo-random value, hash the concatenated string into a token, and allow a web command in response to the web command including a user agent having the token or block the web command in response to the web command not including a user agent having the token.

14 Claims, 5 Drawing Sheets

KEYED COMMUNICATION TOKEN

FIELD

This disclosure relates generally to the field of electronic communications, and more specifically, to keyed communication tokens.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

Hypertext Transfer Protocol (HTTP) is a popular communication protocol used by several modern information systems. Particularly, HTTP is a request-response protocol that follows a client-server model. In some cases, a client computer may execute a web browser to access content and/or applications stored on a server computer. Hence, the client may submit an HTTP request message to the server, which may then execute one or more actions and return an HTTP response message to the client.

As one of its many features, the HTTP protocol allows a server to identify a client's specific web browser through the browser's use of a "user agent" header in the HTTP request. The user-agent header often identifies the particular web browser by name, software vendor, software revision, etc. One of the user agents' main purpose has been to allow a web server to adjust a web page's design, so that the page is adequately rendered by the requesting browser.

The inventor hereof has determined, however, that an increasingly large number of malicious software ("malware" such as, for example, computer viruses, worms, Trojan horses, rootkits, keyloggers, dialers, spyware, adware, etc.) now perform HTTP protocol connections that use fake user agents. A fake user agent may cause the malware's requests appear as if they have been issued by a typical web browser, thus evading detection by security systems. Also, even non-malicious applications can use a fake user agent in an attempt to circumvent network policies. This type of behavior makes it difficult for a network security system to prevent rogue connections that use HTTP.

SUMMARY

Embodiments of systems and methods for keyed communication tokens are described herein. In an illustrative, non-limiting embodiment, a method may include receiving a key and a seed at a computing device; calculating a pseudo-random value based, at least in part, upon the seed; creating a concatenated string using the key and the pseudo-random value; hashing the concatenated string into a token; and adding the token to a user agent issued by a web browser as part of a command transmitted by the computing device.

For example, the key, the seed, the pseudo-random value, and the token may be alphanumeric strings different from one another. The command may be a Hypertext Transfer Protocol (HTTP) command selected from the group consisting of: GET, HEAD, PUT, POST, DELETE, LINK, and UNLINK. Also, the user agent may be configured to identify the web browser originating the command and includes at least one piece of information selected from the group consisting of: a browser's name, a browser's version, computing device identification, operating system information, and identification of the computing device's processor.

In some implementations, the method may include receiving, at the computing device, initial time information and time interval information. The initial time information represents a time at which a firewall begins allowing commands having user agents that include the token, and the time interval information represents a time period after which the firewall stops allowing commands having user agents that include the token and begins allowing commands having user agents that include a subsequent token.

The method may also include advancing the seed to a subsequent seed at the expiration of the time period; calculating a subsequent pseudo-random value based upon the subsequent seed; creating a subsequent concatenated string using the key and the subsequent pseudo-random value; hashing the subsequent concatenated string into the subsequent token; and adding the subsequent token to a user agent issued by the web browser as part of a subsequent command transmitted by the computing device.

Additionally or alternatively, the method may include receiving, at the computing device, an indication of a predetermined number of commands, where the indication represents a number of commands for which a firewall accepts user agents that include the token, where the firewall is configured to block commands having user agents that include the token after having received the predetermined number of commands, and where the firewall is configured to begin allowing commands having user agents that include a subsequent token after having received the predetermined number of commands. In some cases, the predetermined number of commands may be one. In other cases, the predetermined number of commands may be two or more.

The method may further include advancing the present seed to a subsequent seed after the predetermined number of commands is issued by the computing device; calculating a subsequent pseudo-random value based upon the subsequent seed; creating a subsequent concatenated string using the key and the subsequent pseudo-random value; hashing the subsequent concatenated string into the subsequent token; and adding the subsequent token to a user agent issued by the web browser as part of a subsequent command transmitted by the computing device.

In another illustrative, non-limiting embodiment, a method may include identifying a key and a seed; generating a pseudo-random value using the seed; creating a concatenated string using the key and the pseudo-random value; hashing the concatenated string into a token; and at least one of: allowing a web command in response to the web command including a user agent having the token; or blocking the web command in response to the web command not including a user agent having the token. In some cases, the web command may be issued by one or more web browsers executed by one or more client devices, and allowing the web command includes removing the token from the web command prior to forwarding the web command to a specified destination.

Additionally or alternatively, the method may include identifying initial time information and time interval information, where the initial time information represents a time at which the computing system begins allowing web commands having user agents that include the token, and where the time interval information represents a time period after which the computing systems stops allowing web commands having user agents that include the token and begins allowing web commands having user agents that include a subsequent token. The method may also include advancing the seed to a subsequent seed value at the expiration of the time period; generating a subsequent pseudo-random value using the subsequent seed; creating a subsequent concatenated string using the key and the subsequent pseudo-random value; hashing the subsequent concatenated string into the subsequent token; and at least one of: allowing another web command in response to the other web command including a user agent having the subsequent token; or blocking the other web command in response to the other web command not including a user agent having the subsequent token.

Additionally or alternatively, the method may include identifying a predetermined number of web commands from a given client device for which the computing system accepts user agents that include the token; blocking web commands from the given client device having user agents that include the token after having received the predetermined number of web commands from the given client device; and allowing web commands from the given client device having user agents that include a subsequent token after having received the predetermined number of web commands from the given client device. The method may also include advancing the seed to a subsequent seed value after the predetermined number of web commands is received from the given client device, generating a subsequent pseudo-random value using the subsequent seed, creating a subsequent concatenated string using the key and the subsequent pseudo-random value; and hashing the subsequent concatenated string into the subsequent token.

In yet another illustrative, non-limiting embodiment, a method may include identifying a key and a seed; generating a pseudo-random value using the seed; creating a concatenated string using the key and the pseudo-random value; hashing the concatenated string into a token; and adding the token to a string transmitted as part of a request issued by the computing system. For example, the request may be a web command, and the string may be transmitted as part of a web browser's user agent. The method may also include updating the seed, generating an updated pseudo-random value, creating an updated concatenated string using the key and the updated pseudo-random value, and hashing the updated concatenated string to create a new token in response to at least one of: an expiration of a time period, or a number of requests having been issued by the computing system.

In various implementations, one or more of the techniques described herein may be performed by one or more computing systems or electronic devices. For example, a computing system may include a processor and a memory, the memory configured to store program instructions executable by the processor to perform one or more operations disclosed herein. In other embodiments, a tangible or non-transitory computer-readable storage medium may have program instructions stored thereon that, upon execution by one or more computing systems or electronic devices, cause the computing systems or electronic devices to perform one or more operations disclosed herein.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
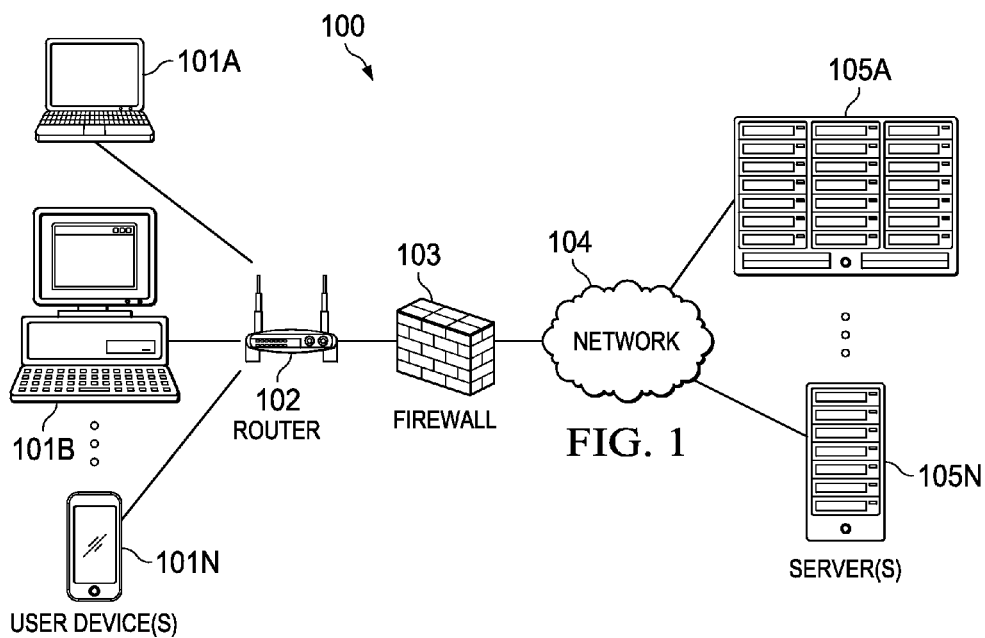
FIG. 1 is a diagram of an example of an environment where certain systems and methods described herein may be employed, according to some embodiments.

Embodiments discussed herein are directed to systems and methods for keyed communication tokens. In some implementations, these systems and methods may be used for establishing and/or maintaining secure communications between two or more computing devices such as, for instance, servers, desktops, laptops, tablets, mobile phones, switches, routers, gateways, firewalls, etc.

In some applications, the techniques discussed herein may be used, for example, to prevent malware requests from appearing as if they have been issued by a web browser, thus facilitating detection by security systems. Additionally or alternatively, the same techniques may be used to prevent other non-malware applications (e.g., videoconferencing applications, etc.) from circumventing network policies or the like. It should be noted that the numerous examples that follow below are provided in the context of the Hypertext Transfer Protocol (HTTP), but that these techniques may also be used with other communication protocols.

In some embodiments, a security token may be added to an HTTP request issued by a web browser executed by user's computing device (i.e., a client). A firewall, proxy server, or other computing device may allow the client's HTTP request to be processed or fulfilled only if the token in the HTTP request matches an expected token. The expected token may change over time and/or in response to a number of previously issued HTTP commands. For example, the expected token may change every few seconds or minutes, and the user's computing device may be configured to update its token in synchronicity with what is expected by a firewall—otherwise the user device's HTTP requests may be blocked by the firewall.

In some cases, the security token may be added to a user agent portion of the web browser's HTTP request. Thus, in some embodiments, the techniques discussed herein may be implemented without changing the HTTP standard.

Examples of HTTP commands, directives, or methods include, but are not limited to, GET, HEAD, PUT, POST, LINK, and UNLINK. When a web browser transmits these commands in the form of an HTTP request, the HTTP request includes a header portion. Moreover, the header portion of the HTTP request includes a user agent field. Currently, user agents are defined in the Internet Engineering Task Force's Request for Comments (RFC) No. 2616, under section 14.43. Four real-world examples of user agents strings are shown in the Table below for sake of illustration only:

TABLE I

Examples of User Agents

| | |
|---|---|
| 1 | Mozilla/5.0 (iPad; U; CPU OS 3_2 like Mac OS X; en-us) AppleWebKit/531.21.10 (KHTML, like Gecko) Version/ 4.0.4 Mobile/7B334b Safari/531.21.102011-10-16 20:23:50 |
| 2 | Chrome/14.0.835.202 Safari/535.12011-10-16 20:21:13 |
| 3 | BlackBerry8300/4.2.2 Pro file/MID P-2.0 Configuration/ CLDC-1.1 VendorID/I 07 UP .Link/6.2.3.15.02011-10-16 20:20: 17 |
| 4 | IE 7? Mozilla/4.0 (compatible; MSIE 7.0; Windows NT 5.1; .NET CLR 1.1.4322; .NET CLR 2.0.50727; .NET CLR 3.0.04506.30) 2011-10-16 20:20:09 |

As previously noted, the user agent header field in an HTTP request contains information about the user agent originating the request. As such, in some cases, user agents may be used for statistical purposes, error control, and automated recognition (e.g., for the sake of tailoring response to specific user agents). Each of the different elements of each user agent may be generally referred to as a "token." In some embodiments, a security token may be added to a user's computer and/or web browser user agent to implement some of the techniques described herein.

After the HTTP request is issued by the user's computer, the server responds to the user's web browser with an HTTP response. The response typically includes the HTTP version, a response status code, and a phrase describing the status code (e.g., HTTP/1.0 200 OK; HTTP/1.0 404 Not Found; etc.).

FIG. 1 is a diagram of an example of environment 100 where certain systems and methods described herein may be employed, according to some embodiments. Particularly, user computing devices or "clients" 101A-N are communicatively coupled to router 102. Examples of clients 101A-N include, but are not limited to, mobile phones, tablet computers, wearable computers, laptop computers, desktop computers, etc. Examples of router 102 include, but are not limited to, wired routers, wireless routers, switches, modems, gateways, etc.

In some implementations, firewall 103 may be coupled to or otherwise integrated within router 102. Firewall 103 may be a software or hardware-based network security system that controls incoming and/or outgoing network traffic by analyzing data packets and determining whether they should be allowed through or not, for example, based upon a set or rules or filters.

In some cases, elements 101A-N, 102, and 103 may be part of a Local Area Network (LAN), for instance, within a company or enterprise. Firewall 103 may be coupled to network 104, typically part of a separate Wide Area Network (WAN). In general, network 104 may include any suitable type of network or combinations of different networks, such as, for example, a Public Switched Telephone Network (PSTN), cellular networks (e.g., 3G, 4G, LTE, etc.), Personal Communication Services (PCS) networks, cable transmission systems, satellite communication systems, electrically conductive transmission lines, fiber optic links, Metropolitan Area Networks (MANs), intranets, extranets, etc.

Servers 105A-N may be capable of providing one or more resources to clients 101A-N such as, for example, web pages, applications, etc. In some implementations, these resources may be accessed using the HTTP protocol. For example, client 101A may issue an HTTP request for a web page hosted by server 105A. The HTTP request is analyzed by firewall 103 and, if allowed, is passed on to server 105A through network 104. An HTTP response is then sent by server 105A back to client 101A. Again, firewall 103 may analyze and/or filter the HTTP response prior to it reaching client 101A.

Here it should be noted that environment 100 is provided for sake of illustration only. In some applications, firewall 103 may be outside of the aforementioned LAN and located in proximity to server(s) 101A-N. In other embodiments, two or more firewalls may be used. In yet other embodiments, firewall 103 may be absent and server 105A, for example, may be a proxy server that is configured to respond to certain HTTP requests while blocking other requests—in other words, servers 105A may act as a firewall 103 in some respects.

Figure 2:
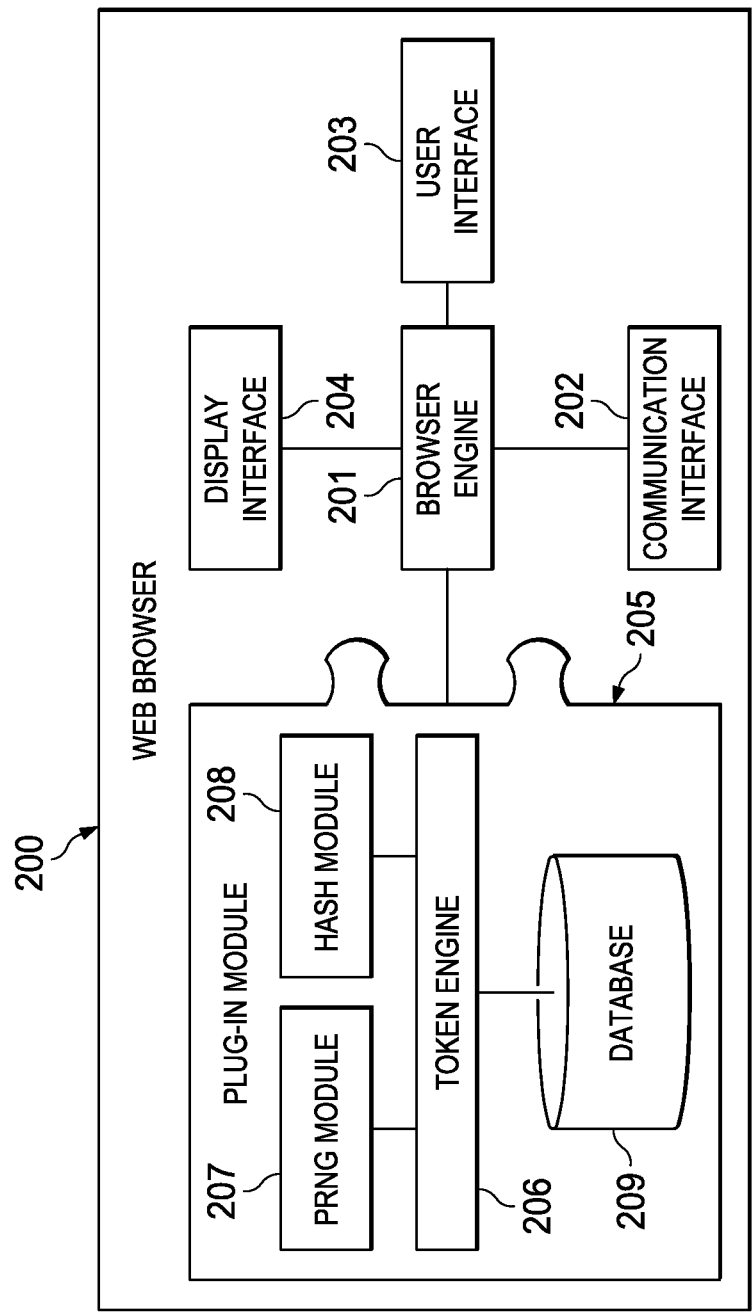
FIG. 2 is a block diagram of an example of a web browser, according to some embodiments.

FIG. 2 is a block diagram of an example of web browser 200. In some embodiments, web browser 200 may be executed by one or more of client devices 101A-N shown in FIG. 1. Moreover, browser 200 includes browser engine 201, communication interface 202, user interface 203, and display interface 204.

Browser engine 201 is web browser 200's processing core. As such, browser engine 201 carries out the general operations of web browser 200. Communication interface 202 is configured to allow web browser 200 to transmit and receive HTTP messages. Display interface 204 generates a web browser window 104, and sends content processed by browser engine 201 to that window, which is then rendered by a client device's display. User interface 203 is configured to listen for events generated by a user operating the client device (e.g., closing a window, "clicking" on portions of a webpage, etc.).

In some cases, browser engine 201 may cooperate with plug-in module 205 to extend the functionality of web browser 200. For example, plug-in module 205 may be configured to give browser engine 201 the ability to add security tokens to user agents within HTTP requests transmitted by communication interface 202. To that end, plug-in module may include token engine 206, Pseudorandom Number Generator (PRNG) module 207, mask or hash module 208, and database 209. Operation of each of modules 205-209 is illustrated in more detail below with respect to FIG. 5.

Briefly, token engine 206 may be configured to coordinate the operations of modules 207 and 208, and may provide an interface to browser engine 201. In some cases, token engine 206 may be configured to access data stored in database 208 (e.g., configuration information, etc.), concatenate two or more strings (e.g., a key and a pseudorandom number), and communicate resulting security tokens to browser engine 201.

PRNG module 207 may include any suitable algorithm (e.g., the Mersenne twister, etc.) configured to generate a sequence of numbers that approximates the properties of random numbers. Upon receiving a seed, PRNG module 207 is capable of outputting a random number. However, the PRNG algorithm is predictable in that it produces the same sequence of numbers given the same seed. In other words, if the algorithm, seed, and last output number is known, the subsequent random number can be produced independently at a different location.

Hash module 208 is configured to map a data set of variable length to a different data set of a fixed length, thus masking the original set. The output of hash module 208 is referred to as a "hash." In some embodiments, hash module 208 may be configured to implement any of a variety of different hash algorithms such as, for example, the Secure Hash Algorithm (SHA) (e.g., SHA-256, etc.). Generally speaking, the resulting hash may be substantially smaller than the input string itself, and may be generated by an algorithm or formula that makes it very unlikely that another input string would result in the same hash value.

It should be noted that web browser 200 is only a simplified example of a web browser that supports plug-in modules. Other embodiments, however, other web browsers may have additional components not illustrated herein for sake of simplicity.

Figure 3:
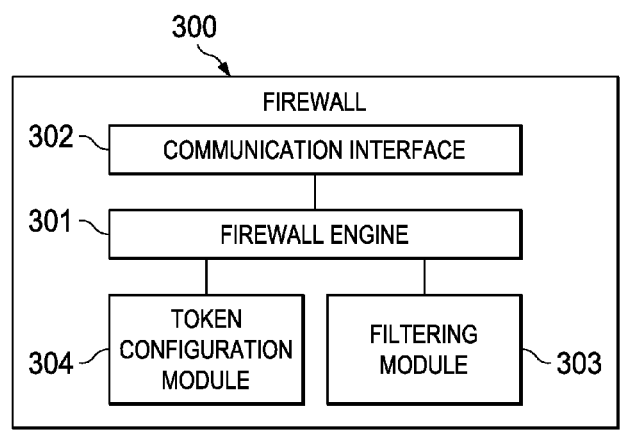
FIG. 3 is a block diagram of an example of a firewall according to some embodiments.

FIG. 3 is a block diagram of an example of firewall 300. In some embodiments, firewall 300 may be implemented by firewall 130 and/or as one or more of servers 105A-N shown in FIG. 1. Particularly, firewall 300 includes firewall engine 301, communication interface 302, filtering module 304, and token configuration module 303. Operation of modules 303 and 304 is illustrated in more detail below with respect to FIG. 4.

Briefly, firewall engine 301 is firewall 300's processing core. As such, firewall engine 301 carries out the general operations of firewall 300. Communication interface 302 is configured to receive HTTP requests issued by clients 101A-N and HTTP responses issued by servers 105A-N. Filtering module 303 is configured to apply one or more rules to allow or block certain ones of the HTTP requests or responses. For example, if an HTTP request received by communication interface 302 does not include a user agent having an appropriate security token, filtering module 303 may cause firewall engine 301 to block the HTTP request, automatically return a predetermined HTTP response (e.g., 404 Not Found) without transmitting the HTTP request to a corresponding one of servers 105A-N, etc.

Token configuration module 304 may be configured to set up certain security token functionality within firewall 300. To that end, token configuration module may include elements similar to those shown in browser plug-in module 205 of FIG. 2 (such as, for example, a PRNG module, a hash module, a token engine, and a database), not explicitly shown here to avoid unnecessary repetition.

In some embodiments, the modules or blocks shown in FIGS. 2 and 3 may represent sets of software routines, logic functions, and/or data structures that, when executed by hardware circuitry, perform the specified operations. Although these modules are shown as distinct logical blocks, in other embodiments at least some of the operations performed by these modules may be combined in to fewer blocks. Conversely, any given one of the aforementioned modules may be implemented such that its operations are divided among two or more logical blocks. Although shown with a particular configuration, in other embodiments these various modules or blocks may be rearranged in other suitable ways.

Figure 4:
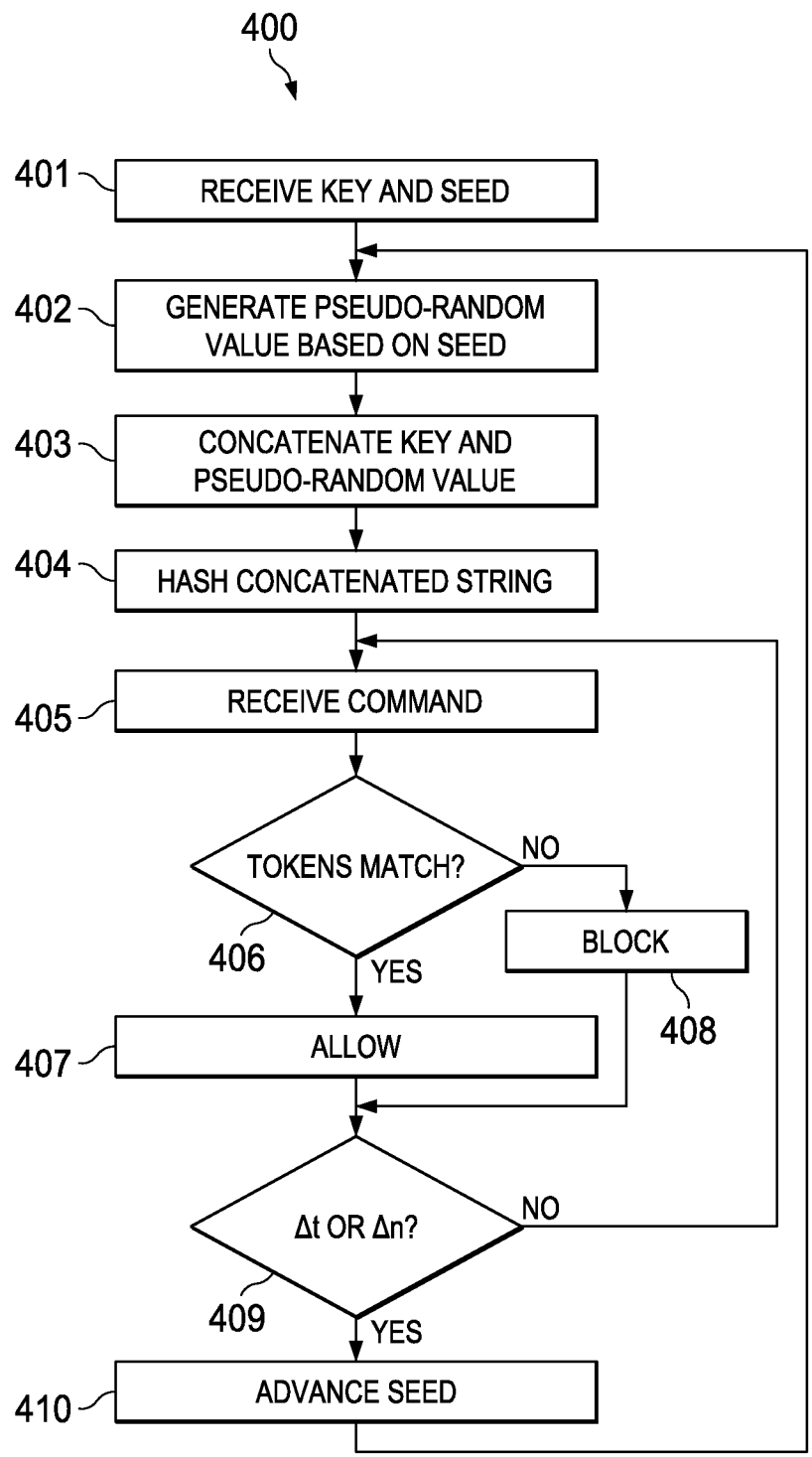
FIG. 4 is a flowchart of an example of a method for processing HTTP requests, according to some embodiments.

FIG. 4 is a flowchart of an example of a method for processing HTTP requests. In some embodiments, method 400 may be performed by firewall 300 of FIG. 3. At block 401, method 400 includes receiving a key and a seed from a user. In some cases, the key and seed may each be a different numeric or alphanumeric string with any suitable number of bits (e.g., 16, 32, 64 bits). These strings may then be stored in a database (e.g., similar to database 209) or the like.

At block 402, method 400 includes generating a pseudorandom value based on the seed. For example, a PSRG module may apply a suitable pseudorandom algorithm to the seed and create a pseudorandom value. At block 403, method 400 includes concatenating the key and the pseudorandom value into a concatenated string. Then, at block 404, the concatenated string may be hashed into a security token.

At block 405, method 400 includes receiving a command such as an HTTP request or the like from one of client devices 101A-N. At block 406, method 400 determines whether a security token included in the user agent of the HTTP request matches the security token obtained at block 404. If so, then at block 407 method 400 allows the HTTP request to be fulfilled. Otherwise, at block 408 method 400 blocks the HTTP request.

Then, at block 409, method 400 determines whether a predetermined amount of time ($\Delta t$) has passed, or whether a predetermined number of HTTP requests ($\Delta n$) has been received from a same client device. If not, method 400 returns to block 405 where it processes another HTTP request. However, if the predetermined amount of time has passed, or if the predetermined number of HTTP requests has been received from the same client device, the current seed may be advanced to a subsequent value (e.g., by incrementing it by 1 or more) and control returns to block 402, where a new pseudorandom value is generated thus resulting in a new subsequent token at block 404.

In some cases, in addition to receiving the key and seed at block 401, method 400 may also include receiving a value for $\Delta t$ and recording an initialization time and/or date ($t_0$). As such, every so often after $t_0$, and with a periodicity determined by $\Delta t$, tokens received in HTTP requests at block 405 are compared to a new, subsequent token at block 406. Additionally or alternatively, method 400 may keep track of the issuer of the HTTP request at block 405. Hence, every time "$\Delta n$" requests (e.g., 1, 2, 3, etc.) are received from the same client device, the token received in HTTP requests at block 405 may also be compared to a new token at block 406.

In some implementations, method 400 may be used to set up a token-based security system in firewall 103. Once the operations of blocks 401-404 are performed, a systems administrator may then configure one or more web browsers' plug-in modules in one or more of client devices 101A-N so that those web browsers are capable of generating their own tokens which match the tokens created at block 404 by firewall 103. For example, the administrator may manually record the key, seed, $t_0$, $\Delta t$, and/or $\Delta n$ of method 400, and then manually input those values into plug-in module 205 of FIG. 2. Additionally or alternatively, one or more of these pieces of information may be provided to web browser 200 electronically in encrypted form. Once authorized, browser 200 may then be capable of independently generating matching, valid tokens.

In some implementations, firewall 300 receives an HTTP request issued by web browser 200, verifies that the security token within the HTTP request matches an expected token at block 406, and then forwards the HTTP request to a specified destination such as, for example, one of servers 105A-N. Moreover, in some embodiments, firewall 300 may remove the security token from the HTTP request prior to forwarding it to its destination, thus transmitting only a modified HTTP request, and therefore preventing other persons connected to network 104 (e.g., the Internet) from having access to the security token.

Figure 5:
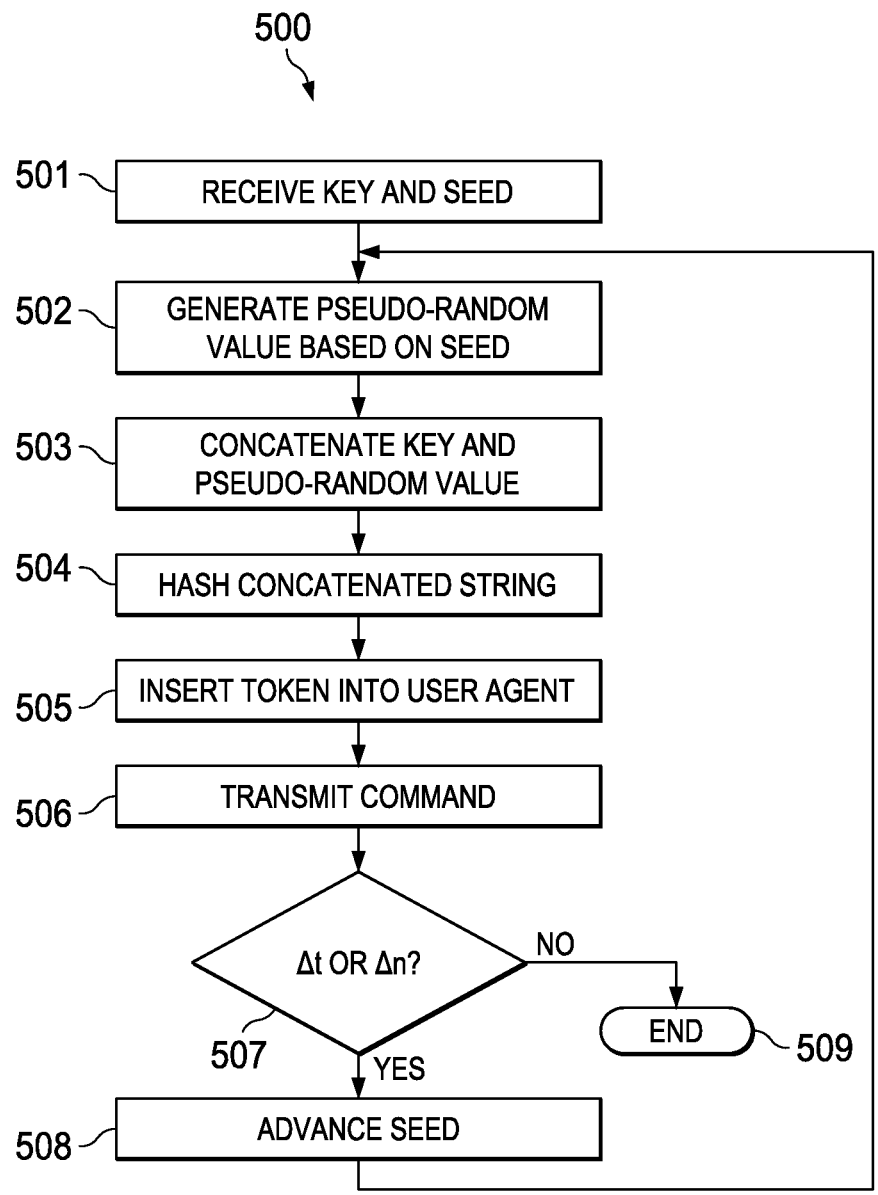
FIG. 5 is a flowchart of an example of a method for issuing HTTP requests, according to some embodiments.

FIG. 5 is a flowchart of an example of a method for issuing HTTP requests. In some embodiments, method 500 may be performed by web browser 200 of FIG. 3 upon its execution by one of client devices 101A-N shown in FIG. 1. At block 501, method 500 includes receiving the same key and seed of block 401 in FIG. 4, as well as $t_0$, $\Delta t$, and/or $\Delta n$. The operations of 502-504 are similar to those of blocks 402-404. Particularly, method 500 also generates a pseudorandom value based on the seed, concatenates the key and the pseudorandom value, and hashes the concatenated value into a resulting token. To illustrate this, the same user agent "1" used in Table I above is repeated below with an example of a security token preceded by the initiating string "KTB" (or "Keyed Token Browser"):

Mozilla/5.0 (iPad; U; CPU OS 3_2 like Mac OS X; en-us) AppleWebKit/531.21.10 (KHTML, like Gecko) Version/4.0.4 Mobile/7B334b Safari/531.21.102011-10-16 20:23:50 KTB (6701 D1a342cf21 e591 d5e0deee36c90e83f2e0d2).

It should be noted, however, that the string "KTB" is used as an example only. In some implementations, other initiating strings may be used. Alternatively, such an initiating string may be absent. Similarly, the use of parenthesis surrounding the security token (in this case "6701d1a342cf21e591d5e0deee36c90e83f2e0d2") is not a requirement. For example, in other cases, other delineating elements such as a slash, dash, period, colon, etc. may be used before and/or after the security token. Alternatively, such a delineating element may be absent.

At block 505, method 500 adds the resulting token to an HTTP request's user agent, and at block 506 method 500 transmits the request. At block 507, if Δt and/or Δn has not been reached, the method ends. Otherwise, the seed is advanced at block 508 and control returns to block 502, after which blocks 502-504 generate a new token.

It should be understood that the various operations described herein, particularly in connection with FIGS. 4 and 5, may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Figure 6:
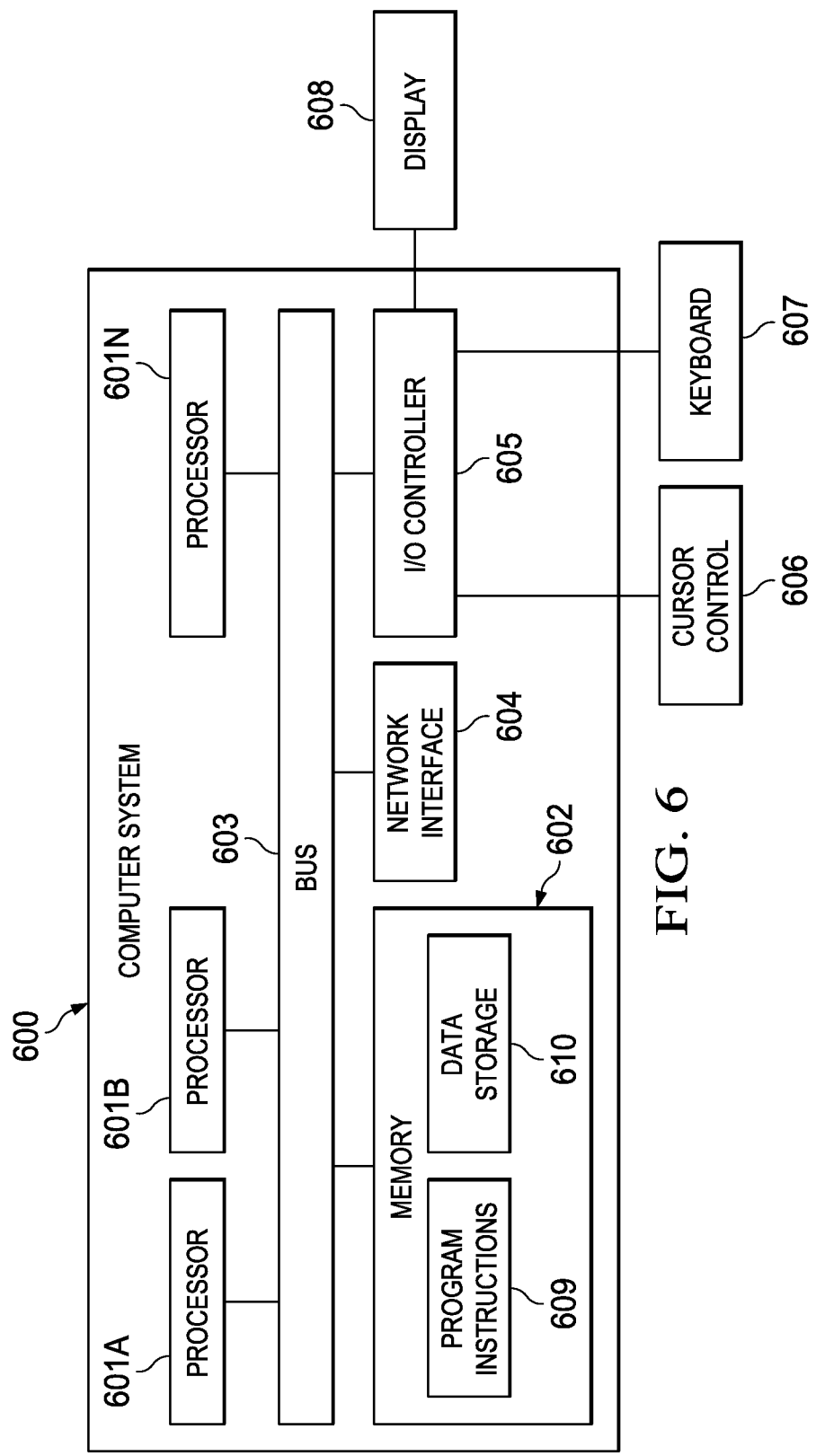
FIG. 6 is a block diagram of an example of a computer system configured to implement various systems and methods described herein according to some embodiments.

In some embodiments, user device(s) 101A-N and/or server(s) 105A-N of FIG. 1 may be implemented as one or more computer systems, an example of which is illustrated in FIG. 6. In various embodiments, computer system 600 may be a server, a mainframe computer system, a workstation, a network computer, a desktop computer, a laptop, or the like.

As illustrated, computer system 600 includes one or more processors 601A-N coupled to a system memory 602 via bus 603. Computer system 600 further includes network interface 604 coupled to bus 603, and input/output (I/O) controller(s) 606, coupled to devices such as cursor control device 606, keyboard 607, and display(s) 608. In some embodiments, a given entity (e.g., server 105A) may be implemented using a single instance of computer system 600, while in other embodiments multiple such systems, or multiple nodes making up computer system 600, may be configured to host different portions or instances of embodiments.

In various embodiments, computer system 600 may be a single-processor system including one processor 601A, or a multi-processor system including two or more processors 601A-N (e.g., two, four, eight, or another suitable number). Processor(s) 601A-N may be any processor capable of executing program instructions. For example, in various embodiments, processor(s) 601A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 601A-N may commonly, but not necessarily, implement the same ISA. Also, in some embodiments, at least one processor(s) 601A-N may be a graphics processing unit (GPU) or other dedicated graphics-rendering device.

System memory 602 may be configured to store program instructions and/or data accessible by processor(s) 601A-N. For example, memory 602 may be used to store software programs 200 or 300 shown in FIGS. 2 and 3, respectively. In various embodiments, system memory 602 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 602 as program instructions 609 and data storage 610, respectively. In other embodiments, program instructions and/or data may be received, sent or stored upon different types of computer-accessible media or on similar media separate from system memory 602 or computer system 600. Generally speaking, a computer-accessible medium may include any tangible, non-transitory storage media or memory media such as electronic, magnetic, or optical media—e.g., disk or CD/DVD-ROM coupled to computer system 600 via bus 603, or non-volatile memory storage (e.g., "flash" memory)

The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, RAM. Program instructions and data stored on a tangible computer-accessible storage medium in non-transitory form may subsequently be transmitted by transmission media or signals such as electrical, electromagnetic, or digital signals, which may be conveyed via a communication medium such as a network and/or a wireless link.

In an embodiment, bus 603 may be configured to coordinate I/O traffic between processor 601, system memory 602, and any peripheral devices including network interface 604 or other peripheral interfaces, connected via I/O controller(s) 605. In some embodiments, bus 603 may perform any necessary protocol, timing or other data transformations to convert data signals from one component (e.g., system memory 602) into a format suitable for use by another component (e.g., processor(s) 601A-N). In some embodiments, bus 603 may include support for devices attached through various types of peripheral buses, such as a variant of the Peripheral Component Interconnect (PCI) bus standard or the Universal Serial Bus (USB) standard, for example. In some embodiments, the operations of bus 603 may be split into two or more separate components, such as a northbridge chipset and a southbridge chipset, for example. In addition, in some embodiments some or all of the operations of bus 603, such as an interface to system memory 602, may be incorporated directly into processor(s) 601A-N.

Network interface 604 may be configured to allow data to be exchanged between computer system 600 and other devices. In various embodiments, network interface 604 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 605 may, in some embodiments, enable connection to one or more display terminals, keyboards, keypads, touch screens, scanning devices, voice or optical recognition devices, or any other devices suitable for entering or retrieving data by one or more computer system 600. Multiple input/output devices may be present in computer system 600 or may be distributed on various nodes of computer system 600. In some embodiments, similar I/O devices may be separate from computer system 600 and may interact with computer system 600 through a wired or wireless connection, such as over network interface 604.

As shown in FIG. 6, memory 602 may include program instructions 609, configured to implement certain embodiments described herein, and data storage 610, comprising various data accessible by program instructions 609. In an embodiment, program instructions 609 may include software elements of embodiments illustrated in FIGS. 2 and/or 3. For example, program instructions 609 may be implemented in various embodiments using any desired programming language, scripting language, or combination of programming languages and/or scripting languages. Data storage 610 may include data that may be used in these embodiments such as, for example, database 306. In other embodiments, other or different software elements and data may be included.

A person of ordinary skill in the art will appreciate that computer system 600 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Although the invention(s) is/are described herein with reference to specific embodiments, various modifications and changes can be made without departing from the scope of the present invention(s), as set forth in the claims below. For example, although presented in the context of HTTP requests, various systems and methods described herein may be implemented with other types of communications. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   receiving a key and a seed at a computing device;
   calculating a pseudo-random value based, at least in part, upon the seed;
   creating a concatenated string using the key and the pseudo-random value;
   hashing the concatenated string into a token;
   adding the token to a user agent issued by a web browser as part of a command transmitted by the computing device;
   advancing the seed to a subsequent seed at the expiration of a time period;
   calculating a subsequent pseudo-random value based upon the subsequent seed;
   creating a subsequent concatenated string using the key and the subsequent pseudo-random value;
   hashing the subsequent concatenated string into a subsequent token;
   adding the subsequent token to a user agent issued by the web browser as part of a subsequent command transmitted by the computing device; and
   receiving, at the computing device, initial time information and time interval information, wherein the initial time information represents a time at which a firewall begins allowing commands having user agents that include the token, and wherein the time interval information represents the time period after which the firewall stops allowing commands having user agents that include the token and begins allowing commands having user agents that include the subsequent token.

2. The method of claim 1, wherein the key, the seed, the pseudo-random value, and the token are alphanumeric strings different from one another.

3. The method of claim 1, wherein the command is a Hypertext Transfer Protocol (HTTP) command selected from the group consisting of: GET, HEAD, PUT, POST, DELETE, LINK, and UNLINK.

4. The method of claim 1, wherein the user agent is configured to identify the web browser originating the command and includes at least one piece of information selected from the group consisting of: a browser's name, a browser's version, computing device identification, operating system information, and identification of the computing device's processor.

5. The method of claim 1, further comprising receiving, at the computing device, an indication of a predetermined number of commands, wherein the indication represents a number of commands for which a firewall accepts user agents that include the token, wherein the firewall is configured to block commands having user agents that include the token after having received the predetermined number of commands, and wherein the firewall is configured to begin allowing commands having user agents that include a subsequent token after having received the predetermined number of commands.

6. The method of claim 5, wherein the predetermined number of commands is one.

7. The method of claim 5, wherein the predetermined number of commands is two or more.

8. The method of claim 5, further comprising:
   advancing the present seed to a subsequent seed after the predetermined number of commands is issued by the computing device;
   calculating a subsequent pseudo-random value based upon the subsequent seed;
   creating a subsequent concatenated string using the key and the subsequent pseudo-random value;
   hashing the subsequent concatenated string into the subsequent token; and
   adding the subsequent token to a user agent issued by the web browser as part of a subsequent command transmitted by the computing device.

9. A computing system, comprising:
   a memory configured to store program instructions; and
   processing circuitry operably coupled to the memory, the processing circuitry configured to execute the program instructions to cause the computing system to:
   identify a key and a seed;

generate a pseudo-random value using the seed;
create a concatenated string using the key and the pseudo-random value;
hash the concatenated string into a token;
at least one of:
  allow a web command in response to the web command including a user agent having the token; or
  block the web command in response to the web command not including a user agent having the token;
identifying initial time information and time interval information, wherein the initial time information represents a time at which the computing system begins allowing web commands having user agents that include the token, and wherein the time interval information represents the time period after which the computing systems stops allowing web commands having user agents that include the token and begins allowing web commands having user agents that include the subsequent token;
advance the seed to a subsequent seed value at the expiration of a time period;
generate a subsequent pseudo-random value using the subsequent seed;
create a subsequent concatenated string using the key and the subsequent pseudo-random value;
hash the subsequent concatenated string into a subsequent token; and at least one of:
  allow another web command in response to the other web command including a user agent having the subsequent token; or
  block the other web command in response to the other web command not including a user agent having the subsequent token.

10. The computing system of claim 9, wherein the computing system includes a firewall, wherein the web command is issued by one or more web browsers executed by one or more client devices, and wherein allowing the web command includes removing the token from the web command prior to forwarding the web command to a specified destination.

11. The computing system of claim 9, the processing circuitry further configured to execute the program instructions to cause the computing system to:
identify a predetermined number of web commands from a given client device for which the computing system accepts user agents that include the token;
block web commands from the given client device having user agents that include the token after having received the predetermined number of web commands from the given client device; and
allow web commands from the given client device having user agents that include a subsequent token after having received the predetermined number of web commands from the given client device.

12. The computing system of claim 11, the processing circuitry further configured to execute the program instructions to cause the computing system to:
advance the seed to a subsequent seed value after the predetermined number of web commands is received from the given client device;
generate a subsequent pseudo-random value using the subsequent seed;
create a subsequent concatenated string using the key and the subsequent pseudo-random value; and
hash the subsequent concatenated string into the subsequent token.

13. A non-transitory computer-readable storage medium having program instructions stored thereon that, upon execution by a processor within a computing system, cause the computing system to:
identify a key and a seed;
generate a pseudo-random value using the seed;
create a concatenated string using the key and the pseudo-random value; hash the concatenated string into a token;
add the token to a string transmitted as part of a request issued by the computing system;
update the seed, generate an updated pseudo-random value, create an updated concatenated string using the key and the updated pseudo-random value, and hash the updated concatenated string to create an updated token in response to at least one of: an expiration of a time period, or a number of requests having been issued by the computing system; and
identify initial time information and time interval information, wherein the initial time information represents a time at which the computing system begins allowing web commands having user agents that include the token, and wherein the time interval information represents the time period after which the computing systems stops allowing web commands having user agents that include the token and begins allowing web commands having user agents that include the subsequent token.

14. The non-transitory computer-readable storage medium of claim 13, wherein the request is a web command, and wherein the string is transmitted as part of a web browser's user agent.

* * * * *